United States Patent
Talesky et al.

(10) Patent No.: US 6,752,572 B2
(45) Date of Patent: Jun. 22, 2004

(54) CIRCLE CUTTING ACCESSORY FOR A POWERED ROTARY HAND TOOL

(75) Inventors: Mark S. Talesky, Huntley, IL (US); Robert D. Pjevach, Lindenhurst, IL (US)

(73) Assignee: S-B Power Tool Corporation, Chicago, IL (US)

( * ) Notice: Subject to any disclaimer, the term of this patent is extended or adjusted under 35 U.S.C. 154(b) by 0 days.

(21) Appl. No.: 10/165,334

(22) Filed: Jun. 7, 2002

(65) Prior Publication Data

US 2003/0228200 A1 Dec. 11, 2003

(51) Int. Cl.$^7$ ................................................ B23Q 9/00
(52) U.S. Cl. ........................ 409/179; 409/182; 409/180; 144/48.6; 144/136.95; 144/135.2; 33/27.03
(58) Field of Search ................................ 409/179, 180, 409/182; 144/48.6, 136.95, 135.2; 33/19.3, 27.03

(56) References Cited

U.S. PATENT DOCUMENTS

| | | | |
|---|---|---|---|
| 2,943,392 A | * 7/1960 | Attridge | ...................... 33/27.03 |
| 3,146,675 A | 9/1964 | Anderson | |
| 3,276,326 A | 10/1966 | Gibbons et al. | |
| 3,292,494 A | 12/1966 | Anderson et al. | |
| 3,635,268 A | * 1/1972 | Lange | ...................... 144/154.5 |
| 4,143,691 A | * 3/1979 | Robinson | ..................... 409/182 |
| 4,685,496 A | * 8/1987 | Livick | .......................... 409/182 |
| 4,798,506 A | * 1/1989 | Kulp, Jr. | ...................... 409/179 |
| 5,016,354 A | * 5/1991 | Baine | ........................... 30/371 |
| 5,289,861 A | * 3/1994 | Hedrick | .................... 144/135.2 |
| 5,486,076 A | * 1/1996 | Hauschopp | .................. 409/179 |
| 5,515,611 A | 5/1996 | Maldonado | |
| 5,555,631 A | 9/1996 | Houston | |
| 5,778,949 A | 7/1998 | Draves | |
| 5,895,183 A | * 4/1999 | McDaniel et al. | ........... 409/179 |
| 5,983,968 A | * 11/1999 | Newman | .................... 144/48.6 |
| 2002/0187014 A1 | * 12/2002 | Bergner et al. | .............. 409/182 |

FOREIGN PATENT DOCUMENTS

| | | | | |
|---|---|---|---|---|
| DE | 3917812 A1 | * 12/1990 | ............. | B25F/5/00 |
| DE | WO 02/26439 A1 | * 4/2002 | ............. | B23Q/9/00 |
| GB | 2202488 A | * 9/1988 | ............. | B27C/5/10 |

* cited by examiner

Primary Examiner—Erica Cadugan
Assistant Examiner—Dana Ross
(74) Attorney, Agent, or Firm—Greer, Burns & Crain, Ltd.

(57) ABSTRACT

A circle cutting accessory for use with a generally cylindrical powered rotary hand tool with an output shaft at one end thereof, the tool having a second accessory attached to the one end, with the second accessory having at its distal end an outwardly extending flange with a first predetermined diameter around a substantial portion of the circumference thereof, the circle cutting accessory including a generally flat housing for receiving and supporting the second accessory and the rotary hand tool. The housing has an upper support surface with an aperture through which a cutting tool attached to the output shaft can pass. The circle cutting accessory further includes a generally horizontal elongated arm mounted to the housing and extends outwardly from the housing. A circle center and sizing elongated member is slidably attached to the arm and has a centering pin extending downwardly therefrom at one end portion. A locking assembly is mounted on the housing and adapted to releasably retain the second accessory and the rotary hand tool.

26 Claims, 8 Drawing Sheets

CIRCLE CUTTING ACCESSORY FOR A POWERED ROTARY HAND TOOL

BACKGROUND OF THE INVENTION

The present invention generally relates accessories for use with powered rotary hand tools, and more particularly to a circle cutting accessory for use with such rotary hand tools.

There has been continued innovation and improvement in the design of accessories for powered rotary hand tools, particularly with regard to accessories that can be used to carry out specialized tasks in woodworking, metal working and the like. Examples of such powered rotary hand tools are those produced under the Dremel brand by the S-B Power Tool Corporation of Chicago, Ill., which also produces many accessory attachments for such rotary hand tools. The rotary hand tools are generally cylindrical in shape and have a motorized drive unit with a rotary output shaft that is adapted to drive the various rotary tools, such as small saw blades, sander discs, grout removal tools and various shaped cutting tool bits. Depth guide attachments are frequently used in connection with the rotary hand tools so that the user may selectively adjust the depth of the cutting tool bit relative to the work surface. Such depth guide attachments are exemplified by those marketed under the Dremel brand.

While circle cutting jigs, which are often referred to as circle cutters, have been available for many years, the manner in which they are coupled to the rotary hand tool has been the subject of continuing efforts to provide a simple and effective mechanism for quickly and securely attaching and detaching the rotary hand tool to the circle cutter. Similarly, conventional circle cutters have been confined to a limited range of cutting radii. Thus, the manner in which conventional circle cutters are presently coupled to rotary hand tools is presently cumbersome, and the size of circles to be cut by the tool has been unduly limited.

SUMMARY OF THE INVENTION

The present invention is related to a circle cutter accessory that provides for quick and secure attachment and detachment of a generally cylindrical, powered rotary hand tool of the type having an output shaft with a tool bit at one end, and is used with a second accessory attachment, such as a depth guide attachment. The second accessory attachment typically used with the rotary hand tool has a generally cylindrical body and an outwardly extending annular flange at the tool bit end of the combination, where the annular flange has a first predetermined diameter around a substantial portion of the circumference thereof.

The circle cutter accessory of the present invention includes a generally flat housing for receiving and supporting the second accessory and the rotary hand tool. A locking assembly is mounted to the housing for releasably retaining the second accessory attachment and the rotary hand tool, and includes a stationary and a sliding plate, the latter of which is movable between an open and a locked position. Both the sliding plate and the stationary plate include a flange, and each respective flange is disposed to oppose the other flange. In the locked position, the flanges of the sliding plate and stationary plate are biased toward one another under spring force, while in the open position, the flanges are separated by a distance sufficient to allow insertion of the annular flange of the second accessory attachment.

The present invention is also related to a circle cutter accessory for a rotary cutting tool including a generally elongate arm having at least one longitudinal slot along at least a substantial portion thereof, and a circle center and sizing elongated member configured to be removably connected to the arm. The member nests in an underside of the arm, and has a centering pin extending downwardly from a first end portion. A threaded connector extends upwardly therefrom at a second end portion, through the longitudinal slot of the arm to releasably secure the member to the arm. Because the member is removable from the arm, the first and second end portions of the member are reversible relative to the arm so as to greatly vary the size of the circles to be cut by the arm.

DETAILED DESCRIPTION OF THE INVENTION

Figure 1:
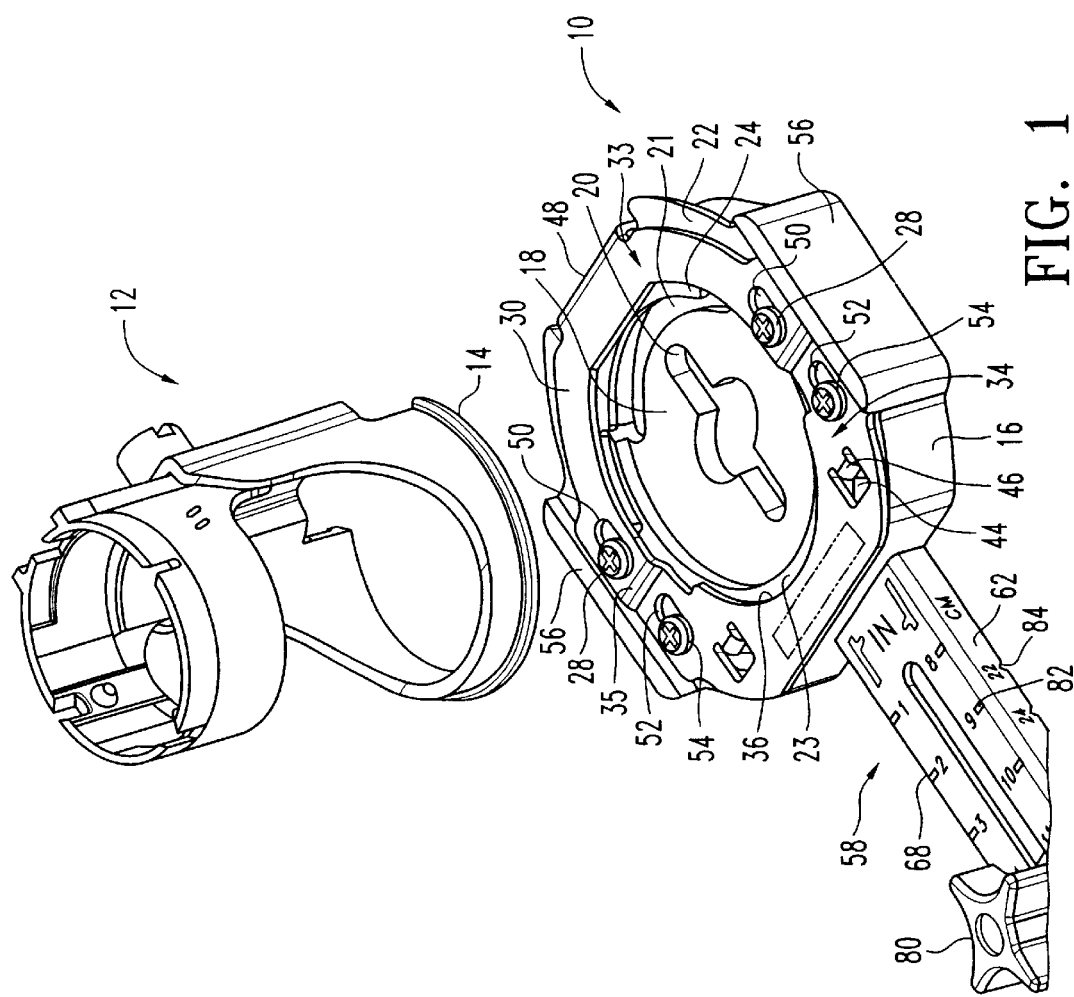
FIG. 1 is a perspective view of a second accessory attachment used in connection with the circle cutter accessory of the instant invention, and a partial perspective view of the circle cutter accessory of the instant invention.
Figure 2:
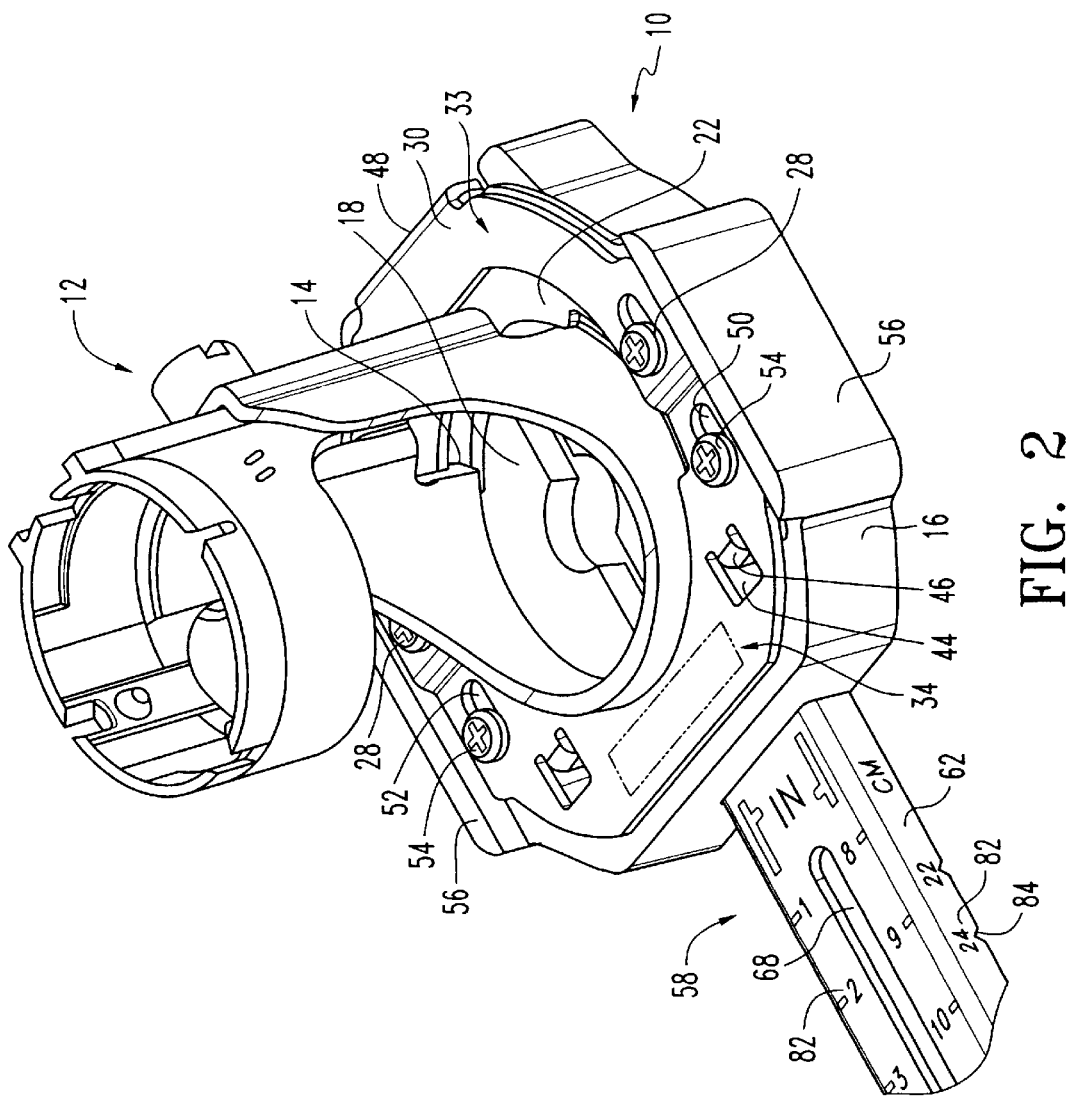
FIG. 2 is a perspective view of the second accessory attachment assembled to a partial perspective view of the circle cutter accessory of FIG. 1.
Figure 3:
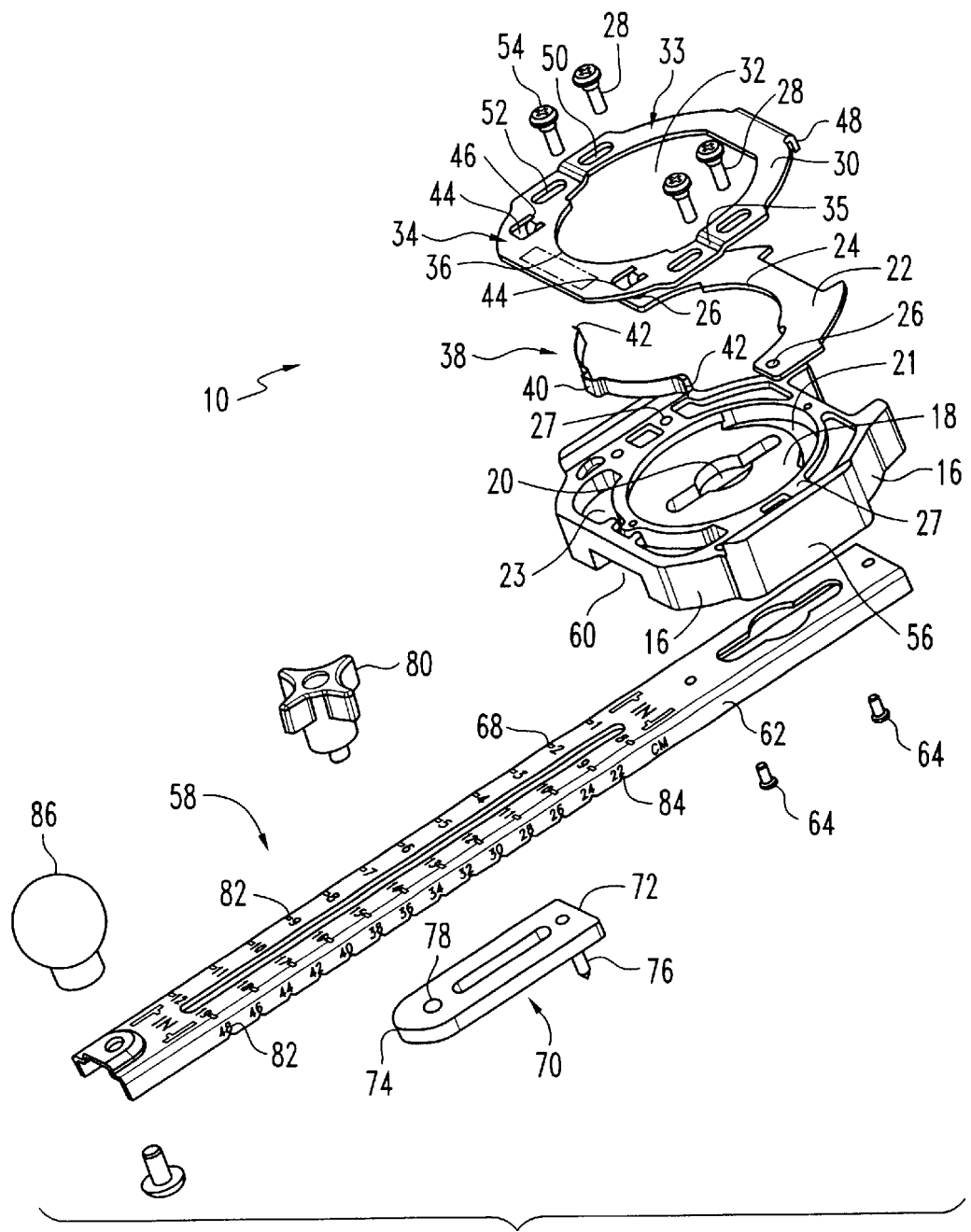
FIG. 3 is an exploded perspective view of the circle cutter accessory of the instant invention.
Figure 4:
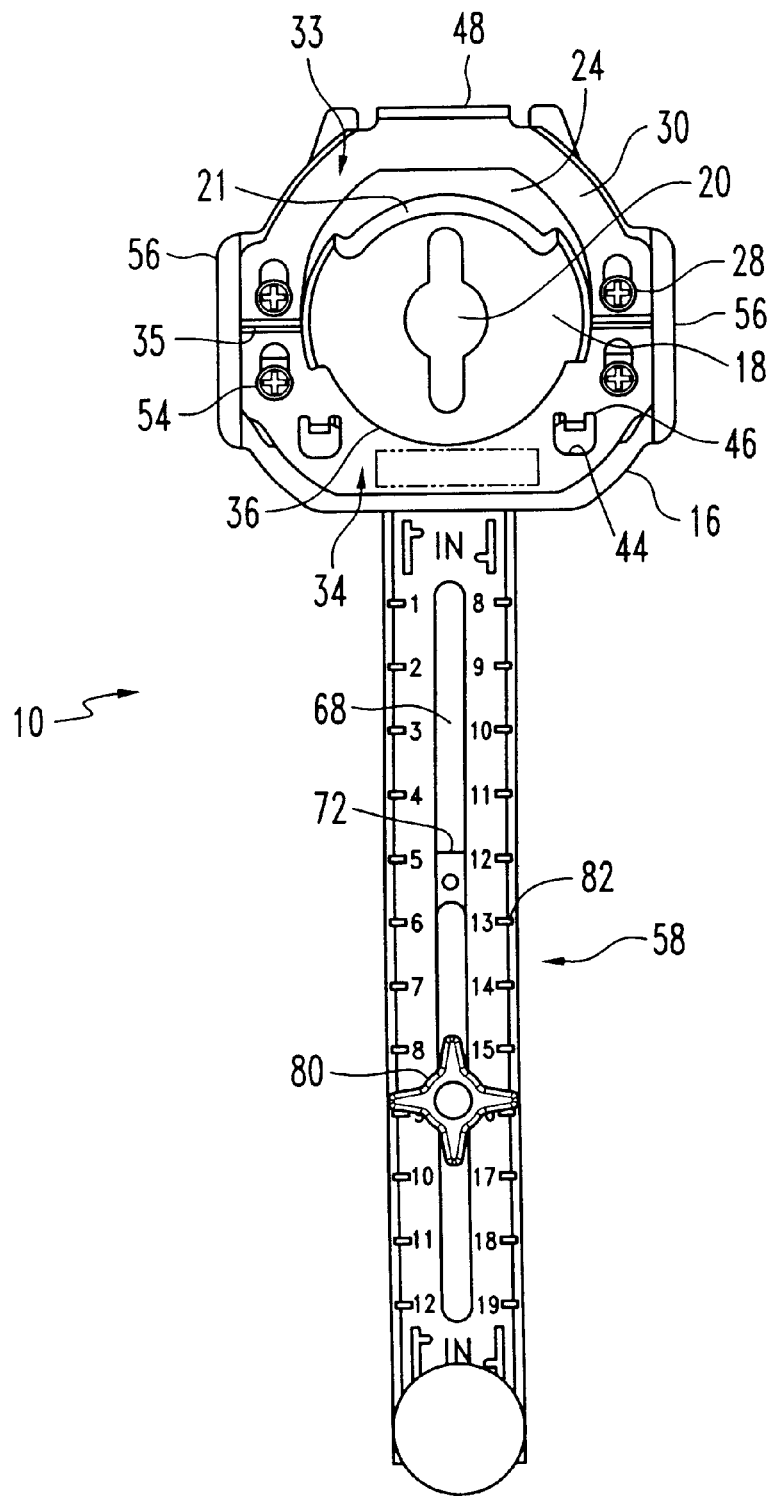
FIG. 4 is top elevational view of the circle cutter accessory of FIG. 3.
Figure 5:
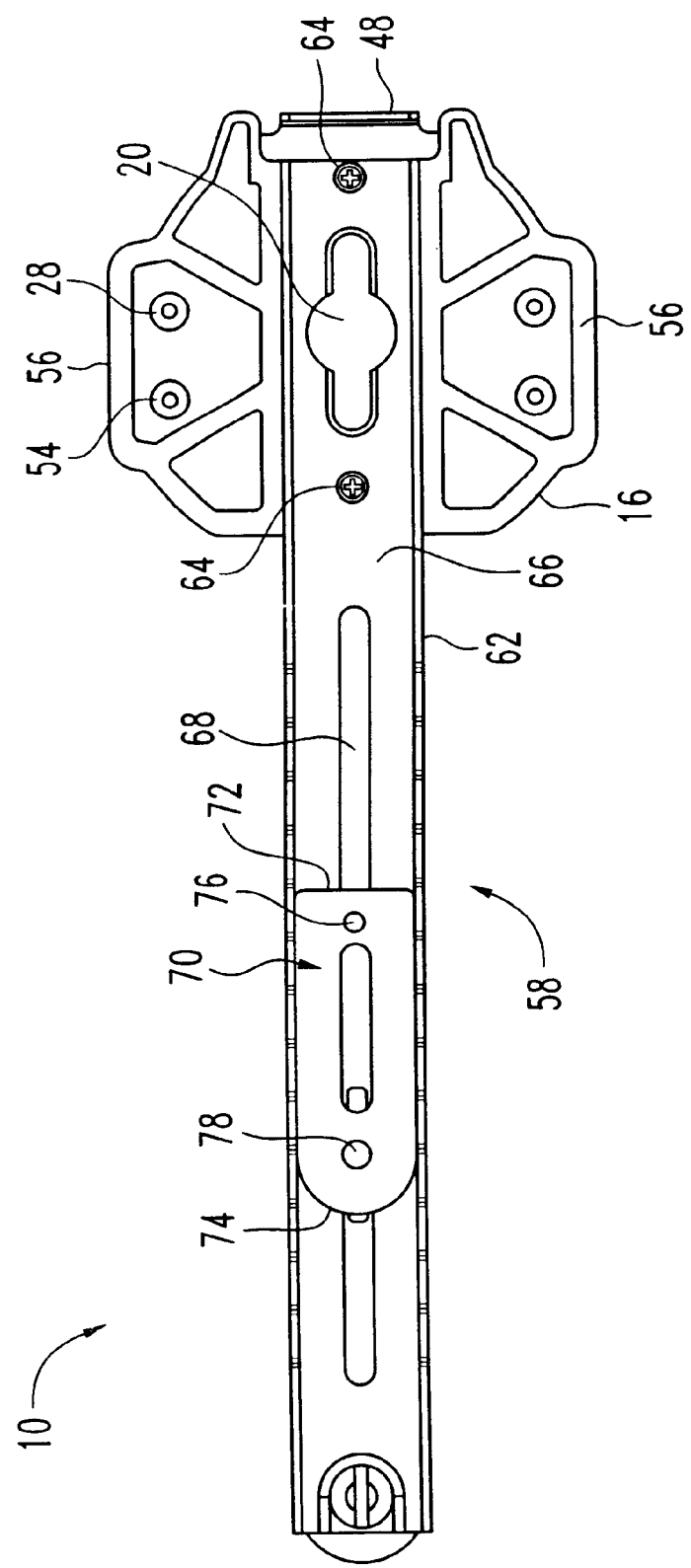
FIG. 5 is a bottom elevational view of the circle cutter accessory of FIG. 3.
Figure 6:
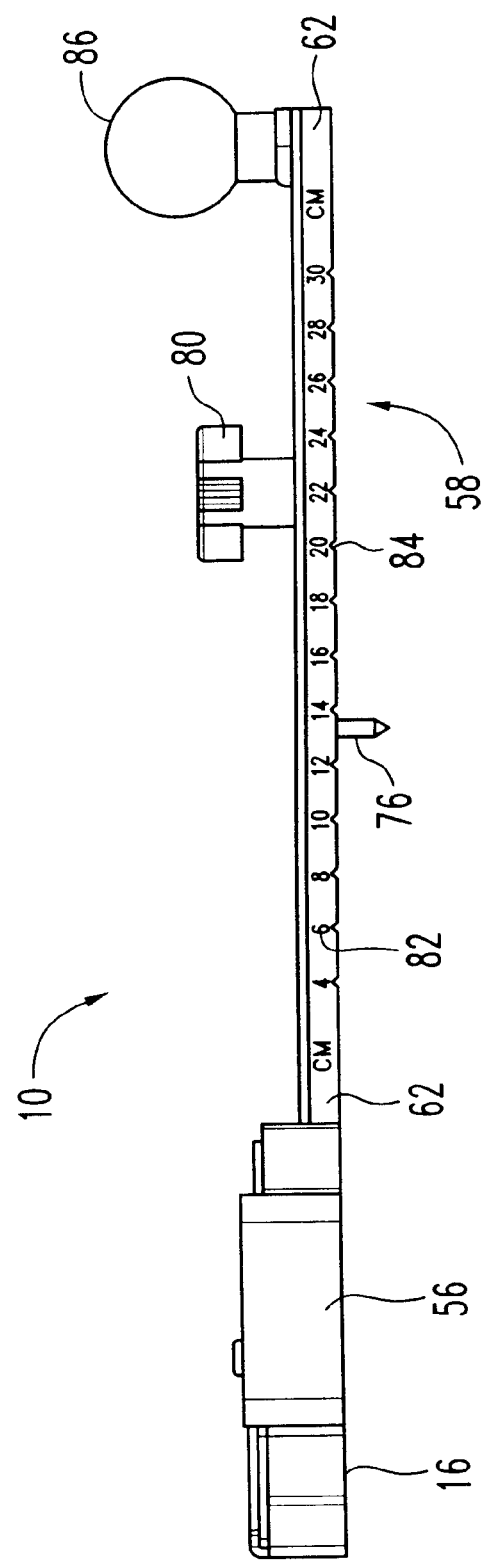
FIG. 6 is a side elevational view of the circle cutter accessory of FIG. 3.
Figure 7:
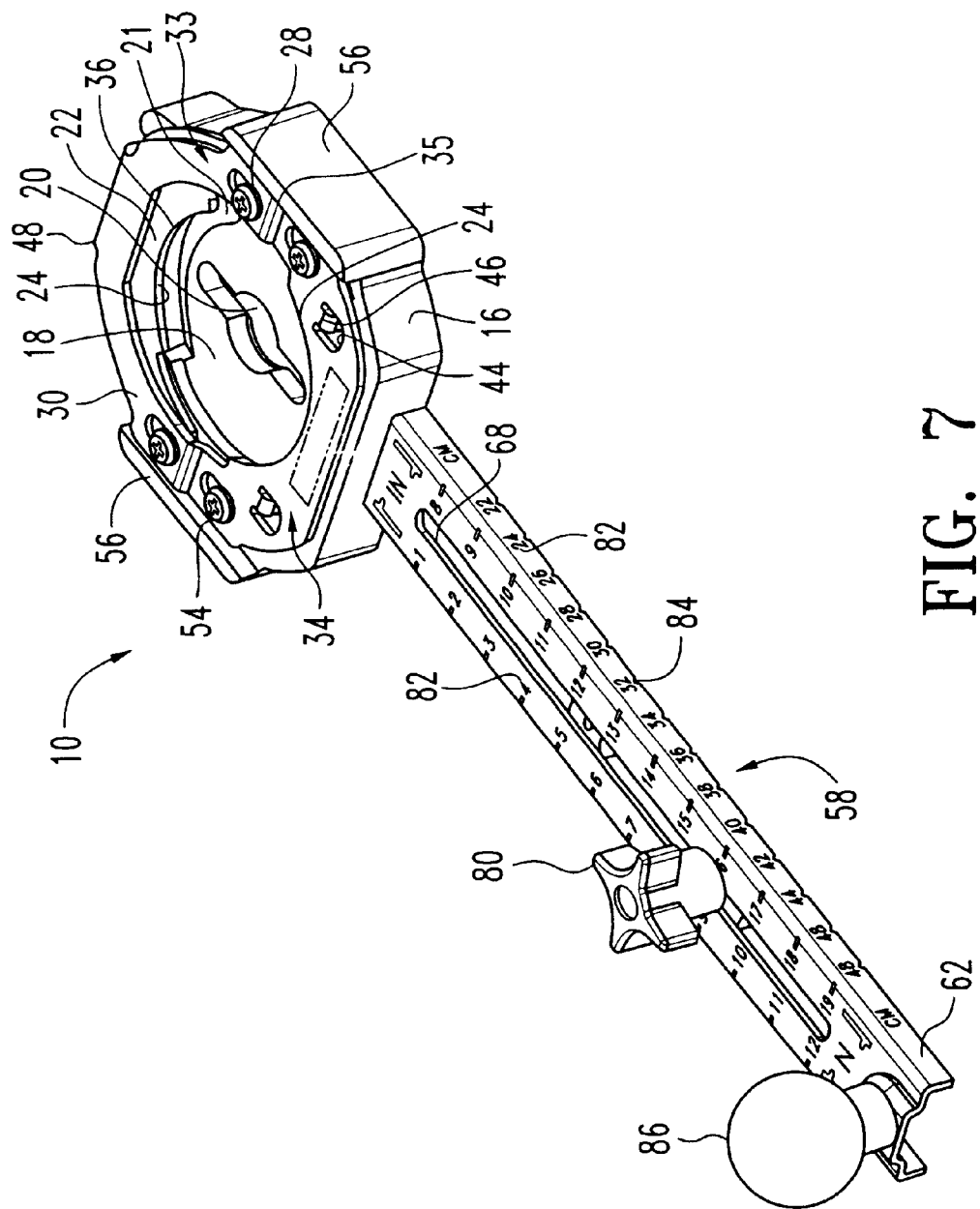
FIG. 7 is a front elevational view of the circle cutter accessory of FIG. 3.
Figure 8:
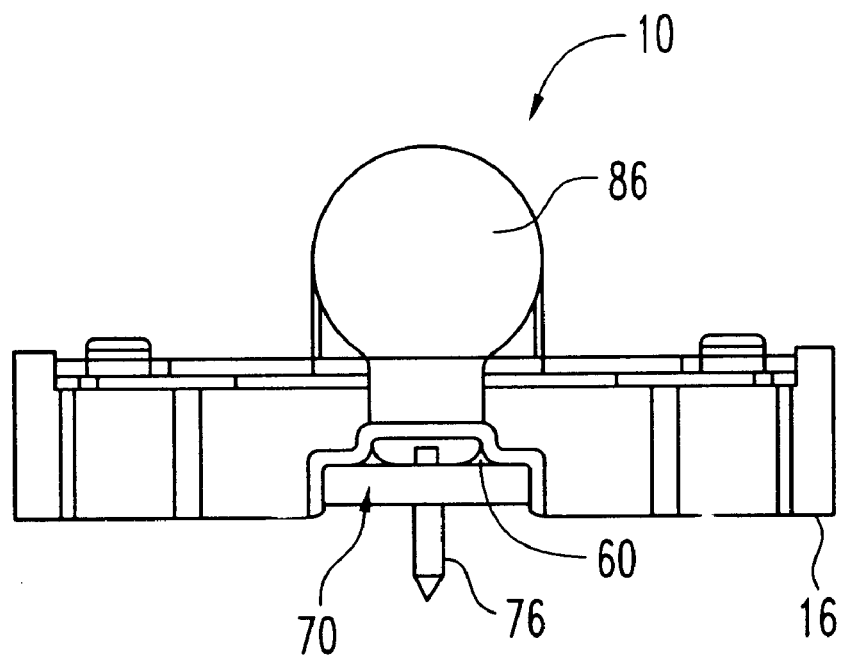
FIG. 8 is a front end view of the circle cutter accessory of FIG. 3.

Turning now to FIGS. 1–3, the preferred embodiment of the circle cutter accessory of the instant invention, designated generally at 10, is typically used in connection with a powered rotary hand tool (not shown) such as the spiral cutting saw illustrated in the drawings and marketed as the Dremel Advantage High Speed Rotary Tool. The rotary hand tool has a generally cylindrical housing, which has an output shaft at a first end thereof, to which a cutting bit or blade (not shown) is ordinarily attached. A second accessory attachment 12, such as a depth guide attachment, attaches to the first end of the rotary hand tool at an attachment end, with the second accessory attachment having at its distal end an outwardly extending annular flange 14 with a first predetermined diameter around a substantial portion of the circumference thereof. The annular flange has a generally planar underside surface. For exemplary purposes only, the depth guide attachment 12 will be shown and described as the second accessory attachment used in connection with the preferred circle cutter accessory of the instant invention, but other second accessory attachments are contemplated for use with the instant invention.

Once the depth guide attachment 12 has been secured to the rotary hand tool, the circle cutter accessory 10 is configured to receive and secure both the depth guide attachment and the rotary hand tool via a locking assembly, which releasably retains the depth guide attachment. The circle cutter accessory 10 includes a generally flat housing 16 for receiving and supporting the depth guide attachment 12 and the rotary hand tool, where the housing of the preferred embodiment is composed of plastic, such as Acrylonitrile Butadiene Styrene (ABS), glass filled nylon, or other plastic. The housing 16 includes a front end portion and a rear end portion, and an upper support surface 18 that is generally circular with a longitudinal aperture 20 through which a cutting tool attached to the rotary hand tool output shaft can pass to contact a work surface. The longitudinal aperture 20 contains a bulbous center portion, and elongated portions continuous with the center portion, where the elongated portions are configured to oppose one another. Among other things, this configuration allows the rotary hand tool to be coupled to the housing 16 with a cutting bit inserted into the output shaft of the rotary hand tool. Since the rotary hand tool is inserted into the housing 16 at an angle, the upper support surface 18 would ordinarily interfere with insertion of the rotary hand tool and cutting bit combination. Providing the longitudinal aperture 20 advantageously allows a user to insert the cutting bit into the output shaft prior to coupling the entire assembly to the housing 16. However, alternative slot configurations are contemplated by the instant invention, and such configurations include those wherein a cutting bit is inserted into the rotary hand tool following coupling to the housing 16. Similarly, an arcuate depression 21 is provided at the front end portion adjacent a stationary plate 22. This enables flanges of the guide attachment 12 to be inserted into the depression 21 at an angle before it is straightened and retained in place. A the rear end portion of the housing 16 is a second arcuate depression 23.

The stationary plate 22 is mounted to the upper support surface 18 and is a component of the locking assembly, is generally hemispherical, and the arc of the hemisphere corresponds generally to the circumference of the generally circular upper support surface 18 of the housing 16. However, in the preferred embodiment of the instant invention, the hemispherical stationary plate 22 includes an arcuate flange 24 along a portion thereof. The arcuate flange 24 has a curvature generally corresponding to the first predetermined diameter of the depth guide attachment 12. The lower surface of the stationary plate 22 is planar and rests flush with a corresponding planar surface of the housing 16. Both the stationary plate 22 and the housing 16 are provided with mating apertures, 26 and 27 respectively, which are configured to vertically align with one another so that threaded connectors 28 may simultaneously pass through both the stationary plate and the housing to secure the stationary plate to the housing 16.

A sliding plate 30, which is another component of the locking assembly, is releasably secured to the upper surface of the stationary plate 22. However, the sliding plate 30 is preferably configured to include a generally circular center opening 32 having a predetermined diameter that is at least slightly larger than that of the generally circular upper support surface 18, and as such, contains a front portion 33 that is mounted to the hemispherical stationary plate 22 and a rear portion 34 that is mounted to the housing 16 itself. Because the portion of the housing 16 to which the stationary plate 22 is mounted is elevationally higher than the bare portion of the housing 16 to which the sliding plate 30 is mounted, the front and rear portions 33, 34 of the sliding plate are elevationally displaced from one another by a transition portion 35. In this way, the sliding plate 30 accounts for the elevational displacement and allows a bottom surface of both the front and rear portions of the sliding plate to be mounted flush with the stationary plate 22 or the housing 16, respectively.

Toward the rear portion 34 of the sliding plate 30, the generally circular center opening 32 includes an arcuate flange 36, which has a radius of curvature that corresponds generally to the radius of curvature of the generally circular center opening 32 and the first predetermined diameter of the annular flange 14 of the depth guide attachment 12. Despite the elevational difference between the front and rear portions 33, 34 of the sliding plate 30, the arcuate flanges 24, 36 of the stationary plate 22 and the sliding plate 30 are configured and arranged to be coplanar. Thus, when assembled in the preferred embodiment, the arcuate flange 36 of the sliding plate 30 opposes the arcuate flange 24 of the stationary plate 22 in the same plane on the generally circular upper support surface 18 of the housing 16.

The sliding plate 30 of the instant invention is configured to be slidably movable in a longitudinal direction with respect to the housing 16 and the stationary plate 22 between a locked position and an open position. To that end, a spring force is provided to bias the sliding plate 30 in the locked position. While numerous methods of spring biasing the sliding plate 30 are contemplated by the instant invention, the preferred embodiment incorporates a leaf spring 38 and positions the leaf spring to urge the sliding plate in the direction of its front portion. The leaf spring 38 of the instant invention is configured to be disposed within the second arcuate depression 23 of the housing 16, beneath the rear portion 34 of the sliding plate 30, and positioned relative to the housing and the sliding plate to bias the sliding plate toward the locked position. The leaf spring 38 of the preferred embodiment is generally arcuate in shape, and includes a middle portion that is a center protrusion 40 for contacting a rear surface inside the rear end portion of the housing 10. At each end of the leaf spring 38 are planar end portions 42. Accordingly, the sliding plate 30 is further provided with two locking openings 44, each of which includes a downwardly depending finger 46 for engaging one of the end portions 42 of the leaf spring to maintain a biasing force on the sliding plate in the locked position. In this locked position, the arcuate flanges 24, 36 of the respective stationary plate 22 and sliding plate 30 have the smallest displacement from one another, and provide the narrowest access to the surface area of the generally circular upper support surface 18 of the housing 16.

When pressure is placed on the sliding plate 30 in the direction of its rear portion 34 by a user, the fingers 46 of the sliding plate are forced against the planar end portions 42 of the leaf spring 38. As the center protrusion 40 is pressed into the rear surface inside of the housing 10, the user's force overcomes the spring force exerted by the leaf spring 38, which is sufficiently compressed to allow the sliding plate 30 to slide in the direction of the rear portion, to the open position. A multitude of mechanisms for exerting compressive force upon the leaf spring 38 are contemplated by the instant invention. By way of example only, the preferred embodiment includes a retraction lever 48 for moving the sliding plate 30 into the open position. The retraction lever of the preferred embodiment includes a downwardly depending flange at the front portion 33 of the sliding plate 30 that is unitary with the sliding plate but extends in a direction generally perpendicular to the plane of the housing 16. Applying pressure on the retraction lever in the direction of the rear portion 34 of the sliding plate 30 allows a user to sufficiently compress the leaf spring 38 and slide the sliding plate into the open position. In the open position, the arcuate flanges 24, 36 of the stationary plate 22 and sliding plate 30 have the greatest displacement from one another, and provide widest access to the surface area of the generally circular upper support surface 18 of the housing 16.

To prevent any lateral movement of the sliding plate 30 as it reciprocates between the locked and open positions, the circle cutter accessory 10 of the instant invention may be provided with additional structural guidance features to confine movement of the sliding plate 30 to the longitudinal direction. For example, the sliding plate 30 of the preferred embodiment includes a plurality of elongated slots 50, 52 preferably four, with a pair of elongated slots on each of the front and rear portions 33, 34, each member of each pair being configured to oppose the other member of the pair, and to be separated from the corresponding member of the other pair by the transition portion 35 of the sliding plate. These elongated slots 50, 52 are multifunctional, with the front portion pair 50 allowing passage of the same threaded connectors 28 that secure the stationary plate 22 to the housing 16, thereby securing all three of the sliding plate 22, the stationary plate 22 and the housing 16 to one another. The rear portion pair 52 allow passage of threaded connectors 54 to secure the sliding plate 30 to the housing 22. However, the elongated slots 50, 52 are further sized and configured to guide longitudinal movement of the sliding plate 30. Thus, the elongated slots 50, 52 are longitudinal in shape, with a width being at least slightly larger than the widest portion of the shaft of the threaded connectors 28, 54. The shafts of the threaded connectors 28, 54 are partially threaded, but contain an unthreaded top portion that is slightly larger in circumference than the threaded portion. In this manner, the threaded connectors 28, 54 are threaded to a predetermined depth, so that a minimal gap of predetermined height exists between the head of the threaded connectors and the top surface of the sliding plate 30 so that the sliding plate may still move in a longitudinal direction. However, the shafts of the threaded connectors 28, 54 prevent lateral movement of sliding plate 30. Moreover, the longitudinal apertures 50, 52 are sized and configured to have a predetermined length such that longitudinal movement of the sliding plate 30 is possible, even with the shafts of the threaded connectors 28, 54 passing therethrough.

Furthermore, the housing 16 itself is preferably configured to promote longitudinal movement of the sliding plate 30 while preventing lateral movement of the same. Side walls 56 extend from, and are unitary with, the sliding plate 30, and are configured to oppose one another. The side walls 56 have a predetermined height that is at least as large as the combined height of the assembled housing 16, stationary plate 22 and sliding plate 30. The sliding plate 30 and side walls 56 of the housing 16 are configured to nestingly engage one another, so that sides of the sliding plate abut smooth inside surfaces of the side walls. Thus, as a user depresses the retraction lever 48, the side walls 56 prevent lateral movement of the sliding plate 30 and instead guide the sliding plate in the longitudinal direction.

Accordingly, to operate a rotary hand tool and depth guide attachment 12 combination with the circle cutter accessory 10 of the instant invention, the user must first prepare the circle cutter accessory 10 to receive the depth guide attachment. The user simply applies force to the retraction lever 48 sufficient to overcome the biasing force of the leaf spring 38. As this occurs, the depending fingers 46 of the sliding plate 30 engage the end portions 42 of the leaf spring 38 to compress the leaf spring against an internal wall of the rear portion 34 of the housing. In this way, the sliding plate 30 slides over the stationary plate 22 and housing 16 into the open position. Since it is in this open position that the arcuate flanges 24, 36 of the stationary plate 22 and sliding plate 30 have the greatest displacement from one another, the outwardly extending annular flange 14 of the depth guide attachment 12 is maximally provided access to the generally circular upper support surface 18 of the housing 16 without interference of the arcuate flanges 24, 36.

Thus, a user tilts the depth guide attachment 12 and rotary hand tool combination at an angle sufficient to allow a rear portion 34 of the annular flange 14 to slide under the arcuate flange of the sliding plate 30. As the combination is brought back into axial alignment with the longitudinal aperture 20 of the housing 16, the generally planar underside surface contacts the generally circular upper support surface 18 of the housing 16. The planar underside surface of the annular flange 14 abuts the planar surface 18 of the housing 16 to rest flush against the housing. The user then releases the retraction lever 48, and the biasing force of the leaf spring 38 urges the sliding plate 30 into the lock position. As this occurs, the arcuate flange 24 of the stationary plate is brought into contact with a front portion of the annular flange 14 of the depth guide attachment 12. Thus, as the stationary plate 22 and sliding plate 30 are urged into the locked position, the arcuate flanges 24, 36 reduce their displacement from one another so that both arcuate flanges engage the annular flange 14 of the depth guide attachment 12 to secure the depth guide attachment and rotary hand tool combination to the circle cutter accessory 10.

To remove the depth guide attachment 12 and rotary hand tool combination to the circle cutter accessory, the user simply reverses the protocol used to engage and secure the combination to the circle cutter accessory 10. The retraction lever 48 is depressed, the sliding plate 30 is urged into an open position, forcing apart the arcuate flanges 24, 36 of the stationary and sliding plates 22, 30, allowing disengagement of the front portion of the annular flange 14 and the arcuate flange 24 of the stationary plate. The user is then free to tilt the combination to a degree sufficient to allow disengagement of the rear portion of the annular flange 14 from the arcuate flange 36 of the sliding plate 30.

Turning now to FIGS. 4–8, the circle cutting accessory 10 of the instant invention also includes a generally horizontal elongated arm 58 mounted to the housing 16 and extending outwardly from the housing. A housing end of the arm 58 connects the arm to the housing, while a handle end extends distal to the housing end. To accommodate the elongated arm 58, an underside of the housing 16 includes a longitudinal groove 60 that is generally rectangular in cross section, and is defined at its deepest surface by a recessed version of the housing 16 and at its sides by downwardly extending side walls of the housing. The fourth side is open to allow the elongated arm 58 to nest therein.

In the preferred embodiment of the instant invention, the elongated arm 58 has a top side and a bottom side, and has both a predetermined length and width, wherein the arm is configured to have a width just slightly less than that of the longitudinal groove 60 so that the top side of the arm 58 snugly nests within the longitudinal groove of the arm. In part to maintain a secure nesting engagement, the arm is further provided with downwardly depending side walls 62 that are transverse to the longitudinal plane of the arm, and which are configured to abut, be coextensive with, an inside surface of the downwardly extending side walls of the housing. While the nesting engagement of the arm 58 within the longitudinal groove 60 of the housing 16 positions and slidably attaches the arm within the housing, threaded connectors 64 are preferably provided to removably secure the arm to the housing at the housing end of the arm.

In addition to providing a snug nesting engagement between the arm 58 and the longitudinal groove 60 of the housing 16, the downwardly depending side walls 62 of the arm are configured to provide a longitudinal channel 66 extending for the length of the arm. The longitudinal channel 66 is generally rectangular in cross section and is defined at its bottom by an underside portion of the arm 58 and at its sides by the downwardly depending side walls 62 of the arm. The remaining side of the longitudinal channel 66 is open to provide access to the channel. In addition to its underside portion, the arm 58 includes a top surface portion and at least one longitudinal slot 68 therethrough extends for a substantial portion of the length of the arm.

The instant invention is further provided with a circle center and sizing elongated member, designated generally at 70, which is slidably attached to the arm 58. The member 70 has a top surface portion and a bottom surface portion, and is configured to have a predetermined shape that will nestingly engage the longitudinal channel 66 of the arm 58. In the preferred embodiment of the invention, the member 70 is generally rectangular in shape at a first end portion 72 with a rounded end at a second end portion 74. The circle center and sizing elongated member 70 of the instant invention may nest within the longitudinal channel 66 of the arm in either of two directions. The first end portion 72 may either be most proximate the housing end of the arm with the second end portion 74 most proximate the handle end of the arm, or just as easily, the first end portion may be most proximate the handle end of the arm with the second end portion most proximate to the housing end of the arm. This reversible positioning advantageously allows the user a greater range of cutting radii, as will be described. The member 70 is also configured to have a predetermined thickness, which may correspond to the dimensions of the longitudinal channel 66.

A centering pin 76 extends downwardly from the bottom surface portion of the member 70 at the first end portion 72. The centering pin 76 is generally cylindrical in shape with an end portion that tapers into a sharpened point so that once a circle center point is chosen on a work surface, the sharpened point of the centering pin will burrow into the work surface at a sufficient depth to prevent unwanted shifting of the center point. Accordingly, while the centering pin 76 has a predetermined length, the pin need only be sufficiently long to exceed the length of the downwardly depending side walls 62 to engage the work surface.

Extending upwardly from the top surface portion of the second end portion 74 of the circle center and sizing elongated member 70 is a threaded engagement aperture 78. The threaded engagement aperture 78 matingly engages a threaded knob member 80, which has a threaded shaft with a circumference that is less than the width of the longitudinal slot 68. The threaded shaft of the knob member 80 extends through the longitudinal slot 68 of the arm from the top surface of the arm. Thus, while the nesting configuration within the longitudinal channel 66 of the arm 58 places the member 70 and the arm in sliding engagement, the preferred embodiment of the instant invention also provides a corresponding threaded knob member 80 to threadedly coupled to the threaded engagement aperture 78 from the top surface portion of the arm. When the top surface portion of the circle center and sizing elongated member 70 abuts the underside portion of the arm 58, the threaded knob member 80 maximally protrudes through the longitudinal slot 68 to the underside of the arm to threadedly engage the threaded engagement aperture 78 until a shelf-like surface of the knob member frictionally engages the top surface portion of the arm 68, thus preventing further threading. In this manner, the nested circle center and sizing elongated member 70 is removably secured to the arm 58. Furthermore, the threaded knob member 80 is ergonomically configured to facilitate simple attachment and removal from the threaded engagement aperture 78.

The circle center and sizing member 70 is configured to have a predetermined length, with the centering pin 76 configured and arranged at a point eccentric to a longitudinal center of the member and at a predetermined longitudinal distance from the threaded engagement aperture 78. The threaded engagement aperture 78 can threadedly engage the threaded knob member 80 through the longitudinal slot 68 of the arm 58 along any portion of the longitudinal slot, and its positioning is only limited by the dimensions of the longitudinal slot. Conversely, because the threaded engagement aperture 78 and the centering pin 76 of the instant circle cutter accessory 10 are longitudinally displaced from one another, the positioning of the centering pin is not confined to the longitudinal dimension of the longitudinal slot 68, but can be positioned on the work surface so that the circle to be cut has a cutting radius either greater than or less than the length of the longitudinal slot, or any length therebetween.

By way of example, if the circle center and sizing member 70 is threaded to the arm 58 so that the first end portion 72 is most proximate the housing end of the arm with the second end portion 74 most proximate the handle end, the threaded engagement aperture 78 may matingly engage the threaded shaft of the threaded knob member 80 through the extreme end of the longitudinal slot 68 nearest the housing end. Thus, the centering pin 76 at the first end portion 72 of the member 70 is positioned underneath the housing 16, and its closest possible position to the cutting tool of the rotary hand tool. It is in this position that the circle cutter accessory 10 provides for the smallest cutting radius to be cut by the cutting tool attached thereto.

On the other hand, if the circle center and sizing member 70 is threaded to the arm 58 so that the first end portion 72 is most proximate the handle end of the arm with the second end portion 74 most proximate the housing end, the threaded engagement aperture 78 may matingly engage the threaded shaft portion of the threaded knob member 80 through the extreme end of the longitudinal slot nearest the handle end. Because the centering pin 76 is longitudinally displaced from the threaded engagement aperture 78, the centering pin may actually extend beyond the bounds of the arm 58 itself. It is in this position that the circle cutter accessory 10 provides for the largest cutting radius to be cut by the cutting tool attached thereto.

Of course the circle center and sizing member 70 may be reversibly positioned at any point along the longitudinal slot 68 as well, providing for an infinite range of cutting radii between the smallest and largest cutting radii. In this way, the circle cutter accessory 10 of the present invention allows for the rotary hand tool to cut a wider range of cutting radii than the longitudinal slot 68 would otherwise permit.

For convenience of the user, the preferred embodiment of the instant invention also optionally includes measurement indicia 82 along the length of the arm 58. The measurement indicia 82 may, for example, denote units of measurement, such as inches, centimeters, or other various gradations of measurement. As illustrated in the drawings, one example of the measurement indicia 82 are the hash marks and numerals denoting measurement in inches. These hash marks and numerals are scored along the longitudinal length of the arm 58, ascending on a first side of the longitudinal slot 68 from the housing end to the handle end of the arm, and ascending on a second side of the longitudinal slot from the handle end to the housing end of the arm. While the first side of the longitudinal slot denotes numbers 1 through 12, and the second side of the longitudinal slot denotes numbers 8 through 19, the present invention contemplates a circle cutter accessory 10 having an arm 58 of any predetermined length, which is to be determined by the manufacturer in response to consumer demand or other practical consideration.

By way of example therefore, the figures illustrate measurement indicia 82 on the first side of the longitudinal slot that denote the measurement in inches when the first end portion 72 of the circle center and sizing member 70 is most proximate the housing end of the arm 58 and the second end portion 74 most proximate the handle end. It is in this position that circles having radii ranging from 1 inch to 12 inches may be cut. The measurement indicia 82 on the second side of the longitudinal slot denote the measurement in inches when the first end portion 72 is most proximate the handle end of the arm 58 and the second end portion 74 is most proximate the housing end. In this position, circles having radii ranging from 8 inches to 19 inches may be cut.

Additionally, the instant circle cutter accessory 10 may optionally include measurement indicia 82 along a bottom edge of the downwardly depending side walls 62 of the arm 58. The measurement indicia 82 on the downwardly depending side walls 62 may be provided in addition to the measurement indicia on the top surface of the arm 58, or may be provided alone. In one embodiment of the instant circle cutter accessory 10, the top surface of the arm 58 contains measurement units in inches, while the measurement units on the downwardly depending side walls are given in metric units, such as centimeters or millimeters. This way, the user is free to operate the circle cutter accessory 10 using either metric or [standard] measurement units. The measurement indicia 82 on the downwardly depending side walls 62 may also include small grooves 84 in the bottom edge of the side walls, so that when the side walls are resting on a work surface, the user may easily gauge an accurate measurement.

Another optional feature for the circle cutter accessory 10 of the instant invention is a handle 86 disposed at the top surface of the handle end of the arm 58. The handle 86 illustrated in the figures is generally bulbous, allowing a user to grasp the handle to exert a counter pressure to balance the weight of the rotary hand tool at the housing end of the arm 58. It is secured to the top surface of the arm by threadedly engaging a threaded member extending from the underside of the arm and through to the top side to engage the handle. Grasping the handle provides further stability to the location of the centering pin 76 to maintain the desired radius length. However, the handle 86 is not fundamental to the circle cutter accessory, which functions as well in its absence. Moreover, the handle 86 need not be bulbous in shape, but could be configured in any conveniently ergonomic design to allow the user to easily grasp at the handle.

While a particular embodiment of the present circle cutter accessory has been described herein, it will be appreciated by those skilled in the art that changes and modifications may be made thereto without departing from the invention in its broader aspects and as set forth in the following claims.

What is claimed is:

1. A circle cutting accessory for use with a generally cylindrical powered rotary hand tool with an output shaft at one end thereof, the tool having a second accessory attached to the one end, with the second accessory being configured to perform a utility separate from a utility performed by said circle cutting accessory and having at its distal end an outwardly extending flange with a first predetermined diameter around a substantial portion of a circumference thereof, said circle cutting accessory comprising:

a generally flat housing for receiving and supporting the second accessory and the rotary hand tool, said housing having an upper support surface with an aperture through which a cutting tool attached to the output shaft can pass and surrounding which aperture is disposed the circumference of the distal end of the second accessory;

a generally horizontal elongated arm mounted to said housing and extending outwardly from said housing;

a circle center and sizing elongated member slidably attached to said arm, said member having a centering pin extending downwardly therefrom at one end portion; and, a locking assembly mounted on said housing and adapted to releaseably retain the second accessory and the rotary hand tool.

2. A circle cutting accessory as defined in claim 1 wherein said locking assembly further comprises:

stationary plate connected to said housing, said stationary plate having an arcuate flange having a curvature generally corresponding to the first predetermined diameter along a portion thereof, said flange being capable of engaging a portion of the second accessory flange when said second accessory is placed on said support surface;

a sliding plate mounted to at least one of said stationary plate and said housing, said sliding plate having an opening larger than said first predetermined diameter and an arcuate flange with a curvature generally corresponding to the first predetermined diameter along a portion thereof with said sliding plate arcuate flange opposing the arcuate flange of said stationary plate, said sliding plate being movable between a locked position and a open position, wherein both of said arcuate flanges engage the second accessory flange when said sliding plate is in said locked position and disengages the same when in said open position.

3. The circle cutting accessory as defined in claim 2 further comprising a spring positioned relative to said housing and said sliding plate to bias said sliding plate toward said locked position.

4. The circle cutting accessory as defined in claim 3 wherein:

said housing further comprises a front end portion and a rear end portion and includes an arcuate orifice at said rear end portion;

said spring comprises a leaf spring having two end portions and a middle portion and extends within said orifice, said middle portion being positioned to abut an internal wall of said housing at said rear end portion; and wherein said sliding plate further comprises two locking orifices, each of said locking orifices including a downwardly depending finger for engaging one of said end portions of said leaf spring to maintain a biasing force on said sliding plate in said locked position.

5. The circle cutting accessory as defined in claim 2 wherein said sliding plate further comprises a retraction lever for moving said sliding plate into said open position.

6. The circle cutting accessory as defined in claim 5 wherein said retraction lever comprises a downwardly depending flange on said sliding plate that is unitary with said sliding plate, and is configured to open said locking assembly when urged in a transverse direction toward said elongate arm.

7. The circle cutting accessory as defined in claim 2 wherein while in said locked position, said arcuate flange of said sliding plate secures a rear portion of the annular flange of the depth guide attachment and said arcuate flange of said stationary plate secures a front portion of the annular flange of the depth guide attachment.

8. The circle cutting accessory as defined in claim 2 wherein said housing further comprises a pair of side walls configured to oppose one another, said sliding plate being configured to nest within said side walls so that said side walls confine said sliding plate to longitudinal movement along a plane of said elongate arm.

9. The circle cutting accessory as defined in claim 2 wherein said sliding plate further includes a first and a second pair of longitudinal slots, said first pair being configured to align with each other in a transverse direction and to oppose said second pair, said second pair also being configured to align with each other in a transverse direction, and wherein a threaded connector extends from said housing through each of said first and second pair of longitudinal slots so that said sliding plate is confined to longitudinal movement along a plane of said elongate arm.

10. The circle cutting accessory as defined in claim 2 wherein said sliding plate includes a front end portion and a rear end portion, said front end portion being elevationally raised from while unitary with said rear end portion so that said front end portion is mounted atop said stationary plate while said sliding plate arcuate flange and said stationary plate arcuate flange are coplanar.

11. The circle cutting accessory of claim 1 wherein said housing includes a bottom surface having generally rectangular longitudinal groove and said elongate arm is configured to removably nest within said longitudinal groove.

12. The circle cutting accessory claim 1 wherein said elongate arm includes indicia of length for measuring a size of a circle to be cut.

13. The circle cutting accessory of claim 1 wherein said elongate arm includes a top surface portion, an underside portion, transverse wall portions depending downwardly from said top surface portion and a longitudinal slot through a substantial portion of said elongate arm.

14. The circle cutting accessory of claim 13 wherein said circle center and sizing elongated member is configured to nest within said underside portion of said elongate arm between said transverse wall portions.

15. The circle cutting accessory of claim 13 wherein said circle center and sizing elongated member is adjustable in a longitudinal direction along said longitudinal slot.

16. The circle cutting accessory of claim 1 wherein circle center and sizing elongated member is reversible relative to said arm to greatly vary the size of circles that can be cut.

17. The circle cutting accessory of claim 1 wherein said circle center and sizing elongated member is slidably attached to said arm, said member having a centering pin extending downwardly therefrom at a first end portion and a threaded connector extending through said arm at a second end portion to removably secure said member to said arm.

18. A circle cutting accessory for use with a generally cylindrical powered rotary hand tool with an output shaft at one end thereof, the tool having a second accessory attached to the one end, with the second accessory having at its distal end an outwardly extending flange with a first predetermined diameter around a substantial portion of the circumference thereof, said circle cutting accessory comprising:

a generally flat housing for receiving and supporting the second accessory and the rotary hand tool, said housing having an upper support surface with an aperture through which a cutting tool attached to the output shaft can pass;

a generally horizontal elongated arm mounted to said housing and extending outwardly from said housing;

a circle center and sizing elongated member slidably attached to said arm, said member having a centering pin extending downwardly therefrom at one end portion;

a locking assembly mounted on said housing and adapted to releaseably retain the second accessory and the rotary hand tool;

a stationary plate connected to said housing, said stationary plate having an arcuate flange having a curvature generally corresponding to the first predetermined diameter along a portion thereof, said flange being capable of engaging a portion of the second accessory flange when said second accessory is placed on said support surface; and a sliding plate mounted to at least one of said stationary plate and said housing, said sliding plate having an opening larger than said first predetermined diameter and an arcuate flange with a curvature generally corresponding to the first predetermined diameter along a portion thereof with said sliding plate arcuate flange opposing the arcuate flange of said stationary plate, said sliding plate being movable between a locked position and a open position, wherein both of said arcuate flanges engage the second accessory flange when said sliding plate is in said locked position and disengages the same when in said open position.

19. The circle cutting accessory as defined in claim 18 further comprising a spring positioned relative to said housing and said sliding plate to bias said sliding plate toward said locked position.

20. The circle cutting accessory as defined in claim 19 wherein:

said housing further comprises a front end portion and a rear end portion and includes an arcuate orifice at said rear end portion;

said spring comprises a leaf spring having two end portions and a middle portion and extends within said orifice, said middle portion being positioned to abut an internal wall of said housing at said rear end portion; and wherein said sliding plate further comprises two locking orifices, each of said locking orifices including a downwardly depending finger for engaging one of said end portions of said leaf spring to maintain a biasing force on said sliding plate in said locked position.

21. The circle cutting accessory as defined in claim 18 wherein said sliding plate further comprises a retraction lever for moving said sliding plate into said open position.

22. The circle cutting accessory as defined in claim 21 wherein said retraction lever comprises a downwardly depending flange on said sliding plate that is unitary with said sliding plate, and is configured to open said locking assembly when urged in a transverse direction toward said elongate arm.

23. The circle cutting accessory as defined in claim 18 wherein while in said locked position, said arcuate flange of said sliding plate secures a rear portion of the annular flange of the depth guide attachment and said arcuate flange of said stationary plate secures a front portion of the annular flange of the depth guide attachment.

24. The circle cutting accessory as defined in claim 18 wherein said housing further comprises a pair of side walls configured to oppose one another, said sliding plate being configured to nest within said side walls so that said side walls confine said sliding plate to longitudinal movement along a plane of said elongate arm.

25. The circle cutting accessory as defined in claim 18 wherein said sliding plate further includes a first and a second pair of longitudinal slots, said first pair being configured to align with each other in a transverse direction and to oppose said second pair, said second pair also being configured to align with each other in a transverse direction, and wherein a threaded connector extends from said housing through each of said first and second pair of longitudinal slots so that said sliding plate is confined to longitudinal movement along a plane of said elongate arm.

26. The circle cutting accessory as defined in claim 18 wherein said sliding plate includes a front end portion and a rear end portion, said front end portion being elevationally raised from while unitary with said rear end portion so that said front end portion is mounted atop said stationary plate while said sliding plate arcuate flange and said stationary plate arcuate flange are coplanar.

* * * * *